United States Patent
Koenck et al.

(10) Patent No.: US 7,308,203 B1
(45) Date of Patent: Dec. 11, 2007

(54) FREE SPACE OPTICAL DATA LINK FOR AIRCRAFT

(75) Inventors: Steven E. Koenck, Cedar Rapids, IA (US); David W. Jensen, Cedar Rapids, IA (US); John L. Meier, St. Charles, MO (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 545 days.

(21) Appl. No.: 10/892,008

(22) Filed: Jul. 15, 2004

(51) Int. Cl.
 *H04B 10/10* (2006.01)
(52) U.S. Cl. .................. 398/118; 398/124; 398/130
(58) Field of Classification Search ............... 398/118, 398/124, 128–131
See application file for complete search history.

(56) References Cited

U.S. PATENT DOCUMENTS

| | | | |
|---|---|---|---|
| 5,606,444 A | 2/1997 | Johnson et al. | 359/152 |
| 6,347,001 B1 * | 2/2002 | Arnold et al. | 398/122 |
| 6,657,783 B1 | 12/2003 | Presby et al. | 359/399 |
| 2004/0022537 A1 * | 2/2004 | Mecherle et al. | 398/41 |

* cited by examiner

*Primary Examiner*—Leslie Pascal

(74) *Attorney, Agent, or Firm*—Nathan D. Jensen; Kyle Eppele

(57) ABSTRACT

The present invention is a method and system for transmitting data between two objects via a free space optical data link. In an exemplary aspect of the present invention, the method may start with a step in which a laser beam modulated with data is transmitted to the vicinity of an optical collector. The laser beam may be transmitted by a modulated laser transmitter. The laser beam may cause atmospheric nitrogen in the vicinity of the optical collector to fluoresce and emit a set of characteristic line spectra. The set of characteristic line spectra may be received by the optical collector, and at least one characteristic spectral line may be obtained with an optical filter. Preferably, a wavelength of the at least one characteristic spectral line is selected from a group consisting of 3995.00 angstroms, 4630.54 angstroms, 5005.15 angstroms, and 5679.56 angstroms, which have high relative amplitude. The at least one characteristic spectral line may be detected and converted to electrical signal by a photodetector. The electrical signal may be amplified from a small signal to a large signal, and the amplified electrical signal may be processed with a communications receiver to obtain the data.

13 Claims, 3 Drawing Sheets

FREE SPACE OPTICAL DATA LINK FOR AIRCRAFT

FIELD OF THE INVENTION

This invention relates generally to data communications systems, and particularly to free space optical communications systems.

BACKGROUND OF THE INVENTION

Traditional telecommunication systems that connect two or more sites with physical wire or cable are generally limited to relatively low-speed, low-capacity applications. In order to address these limitations, recently developed systems utilize optical fibers. However, fibers still require a physical cable connection. To remove this limitation, systems utilizing the free space transmission of one or more light beams modulated with data have been developed. Systems using such beams may greatly improve data speed and capacity rates, up to 10 Gigabits per second (Gbps), over traditional wire-based systems and, at the same time, may avoid the traditional communication system infrastructure cost of laying fiber cable to physically connect one site in the system to another site.

Instead of cables, a free space optical data communications system typically includes at least one transmit telescope and at least one receive telescope for sending and receiving information, respectfully, between two or more communications sites. Each of these telescopes contains optics comprising at least a mirror or lens. The transmit telescope uses its optics to transmit the light beam to the receive telescope. The receive telescope uses its optics to focus the incoming light beam onto the focal plane of the telescope. Generally, each telescope is communicatively coupled to a communications network or other source/destination of information. In operation, the transmit telescope receives information from its respective network via cable or wireless transmission, and then transmits a light beam modulated with this information to one or more destination receive telescopes. Each receive telescope then relays data to its intended destination in its respective network via a cable or wireless transmission.

The aforementioned free space communications systems would, therefore, appear to have the benefits of reducing costs associated with installing and maintaining physical hard-wired portions of networks while, at the same time, increasing transmission capacity. However, free space optical communications may be hampered by misalignment of the telescopes. For example, since the transmit and receive telescopes may be located a great distance from each other, initial alignment of the telescopes, to insure that the transmitted light beam is incident upon the focal plane of the receive telescope, may be difficult to achieve. Additionally, even if initially aligned, misalignment of the transmit and receive telescopes may result from any displacement of the light beam during transmission or any movement of either the transmit or receive telescopes or their respective physical mounting platforms. As a result of such misalignment, the transmitted light beam may not be incident upon the focal plane of the receive telescope, or may only be partially incident thereupon, leading to a loss or degradation of communications connectivity.

There is increasing interest in the use of free space optical communication methodology for tactical and other aircraft flying in close proximity or formation. Modulated lasers are a preferred transmission method for free space optical communications. However, very precise aiming is required for the laser beam to impinge upon relatively small optical collectors.

FIG. 1 is a schematic diagram illustrating a prior art free space optical communications system 100 used by aircraft for transmitting data. The system 100 may include a modulated laser transmitter 102 for transmitting a laser beam modulated with data, an optical collector 104 for receiving the laser beam, a photodetector 106 for converting the received laser beam to an electrical signal, an amplifier 108 for increasing the electrical signal from a small signal to a large signal, and a communications receiver 110 for processing the amplified electrical signal to obtain the data. The modulated laser transmitter 102 may be located on a first flying aircraft. The optical collector 104, the photodetector 106, the amplifier 108, and the communications receiver 110 may be located on a second aircraft. In order to maintain high-quality communications connectivity between these two aircraft, the transmitted laser beam need be incident upon the optical collector 104. If the transmitted laser beam is not incident upon the optical collector 104 or is only partially incident upon the optical collector 104, there may be a loss or degradation of the communications connectivity. Suppose the distance L between the two aircraft is 1 mile and the height H of the optical collector 104 is 6 inches, then in order for the transmitted laser beam to be incident upon the optical collector 104, the required aiming accuracy a of the modulated laser transmitter 102 is about ±0.0027 degrees. Such precise aiming may be hard to achieve between two flying aircraft.

Thus, it would be desirable to provide a method and system for improving free space optical communication which may effectively solve the aforementioned misalignment problem.

SUMMARY OF THE INVENTION

Accordingly, the present invention is directed to a method and system for transmitting data between two objects via a free space optical data link. In an exemplary aspect of the present invention, a method for transmitting data via a free space optical data link process may start with a step in which a laser beam modulated with data is transmitted in the vicinity of an optical collector. The laser beam may be transmitted by a modulated laser transmitter. The laser beam may cause atmospheric nitrogen in the vicinity of the optical collector to fluoresce and emit a set of characteristic line spectra. The set of characteristic line spectra may be received by the optical collector, and at least one characteristic spectral line may be obtained with an optical filter. Preferably, a wavelength of the at least one characteristic spectral line is selected from a group consisting of 3995.00 angstroms, 4630.54 angstroms, 5005.15 angstroms, and 5679.56 angstroms, which have high relative amplitude. The at least one characteristic spectral line may be detected and converted to an electrical signal by a photodetector. The electrical signal may then be amplified from a small signal to a large signal, and the amplified electrical signal may be processed with a communications receiver to obtain the data.

According to an additional exemplary aspect of the present invention, a free space optical communications system for transmitting data between aircraft may include a modulated laser transmitter for transmitting a laser beam modulated with data to the vicinity of an optical collector. The laser beam causes atmospheric nitrogen to fluoresce and emit a set of characteristic line spectra. The system may further include the optical collector for receiving the set of characteristic line spectra; an optical filter for filtering the set of characteristic line spectra to obtain at least one characteristic spectral line; a photodetector for detecting the at least one characteristic spectral line and converting the at least one characteristic spectral line to an electrical signal; an amplifier, communicatively coupled to the photodetector, for amplifying the electrical signal from a small signal to a large signal; and a communications receiver, communicatively coupled to the amplifier, for processing the amplified electrical signal to obtain the data.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention provides a free space optical communications system that may not require a modulated laser transmitter to be aimed directly at an optical collector. The present invention employs the phenomenon of laser induced fluorescence (LIF) in atmospheric nitrogen as a secondary optical transmission medium. LIF is the optical emission from molecules that have been excited to high energy levels by absorption of electromagnetic radiation.

Figure 2:
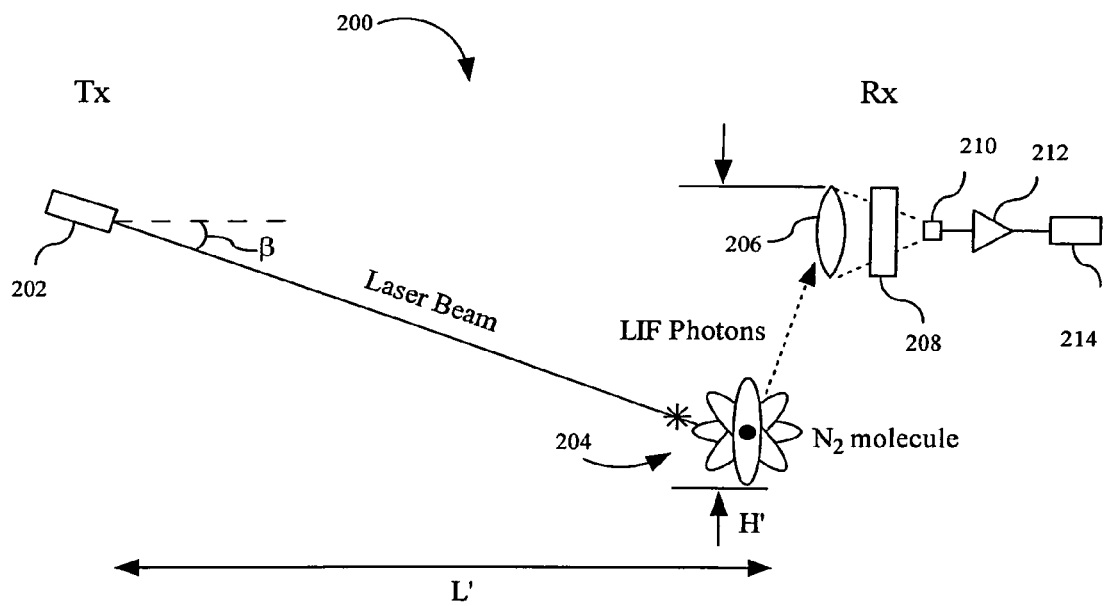
FIG. 2 is a schematic diagram illustrating a free space optical communications system utilizing laser induced fluorescence (LIF) in atmospheric nitrogen as a secondary optical transmission medium in accordance with an exemplary embodiment of the present invention.
Figure 4:
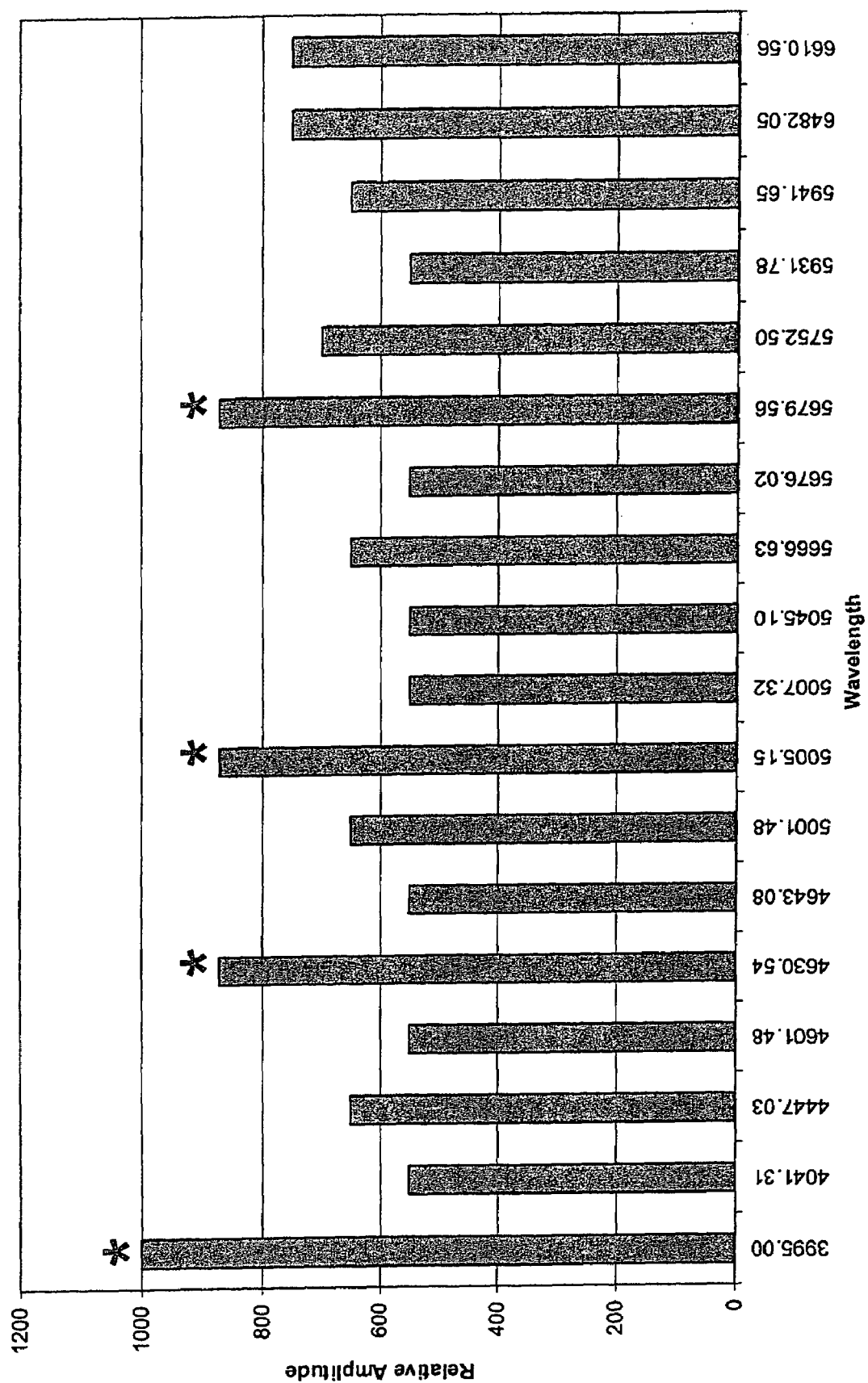
FIG. 4 shows nitrogen characteristic line spectra.

FIG. 2 is a schematic diagram illustrating a free space optical communications system 200 utilizing LIF in atmospheric nitrogen as a secondary optical transmission medium in accordance with an exemplary embodiment of the present invention. The system 200 may include a modulated laser transmitter 202 located on a first aircraft for transmitting a laser beam modulated with data. In an advantageous aspect of the present invention, a greater area of space for receiving signals may be provided. The modulated laser transmitter 202 may not be directly aimed at an optical collector 206 located on a second aircraft. Instead, the modulated laser transmitter 202 may be aimed, via a relatively imprecise beam steering system, at the vicinity 204 of the optical collector 206. The laser beam may cause atmospheric nitrogen in the vicinity 204 to fluoresce and emit a set of characteristic line spectra (see FIG. 4).

The system 200 may further include, on the second aircraft, the optical collector 206 for receiving the set of characteristic line spectra; an optical filter 208 for filtering the set of characteristic line spectra to obtain at least one characteristic spectral line; a photodetector 210 for detecting the at least one characteristic spectral line and converting the at least one characteristic spectral line to an electrical signal; an amplifier 212, communicatively coupled to the photodetector 210, for increasing the electrical signal from a small signal to a large signal (e.g., from a low voltage to a high voltage, from a small current to a large current, or the like); and a conventional communications receiver 214, communicatively coupled to the amplifier 212, for processing the amplified electrical signal to obtain the data. In a preferred embodiment, the optical filter 208 may include an optical interference filter with passband adapted to the at least one characteristic spectral line.

Figure 1:
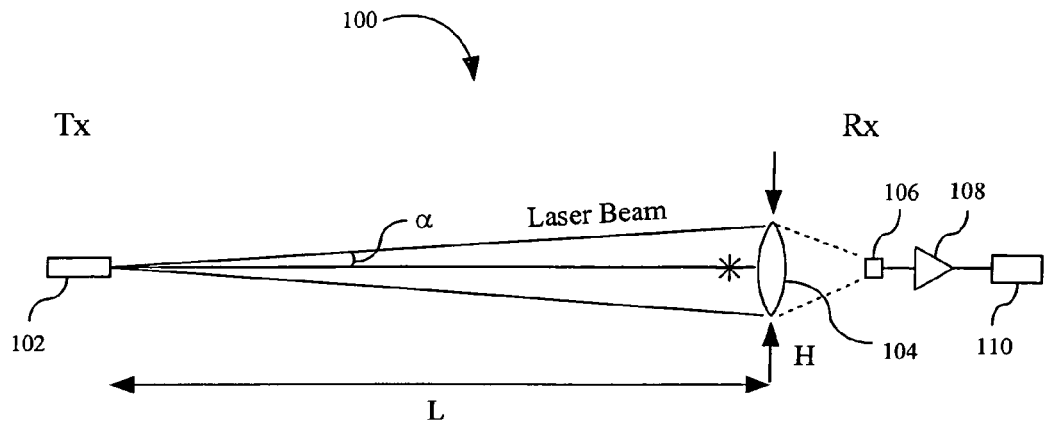
FIG. 1 is a schematic diagram illustrating a prior art free space optical communications system used by aircraft for transmitting data.

The system 200 may greatly relax the required aiming accuracy of the modulated laser transmitter 202 to maintain high-quality free space optical communications connectivity between aircraft. For example, when the distance L' between the two aircraft is 1 mile and the distance H' between the vicinity 204 and the optical collector 206 is 100 feet, then the required aiming accuracy β of the modulated laser transmitter 102 is about ±1 degree. Compared with the aiming accuracy of about ±0.0027 degrees required in the prior art system 100 shown in FIG. 1, the present system 200 may relax the aiming accuracy requirements of the modulated laser transmitter by a factor of more than 300.

Figure 3:
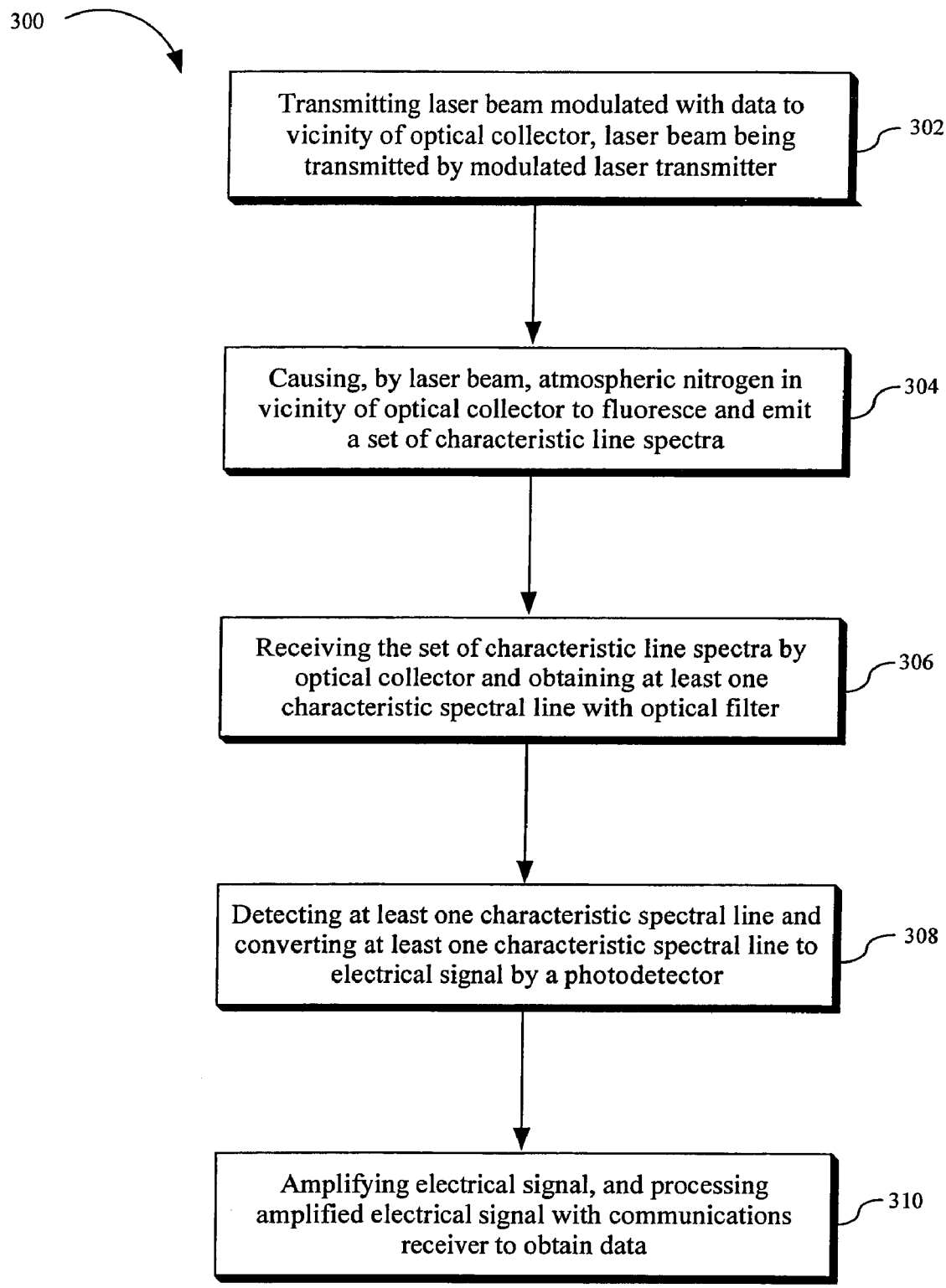
FIG. 3 is a flow diagram of a process for transmitting data between two objects via a free space optical data link in accordance with an exemplary embodiment of the present invention.

FIG. 3 is a flow diagram of a method or process 300 for transmitting data between two objects via a free space optical data link in accordance with an exemplary embodiment of the present invention. The process 300 may be implemented in the system 200 shown in FIG. 2. The process 300 may start with a step 302 in which a laser beam modulated with data is transmitted at the vicinity of an optical collector. The laser beam may be transmitted by a modulated laser transmitter, as contemplated by a person of ordinary skill in the art. The laser beam may cause atmospheric nitrogen in the vicinity of the optical collector to fluoresce and emit a set of characteristic line spectra (see FIG. 4) 304. The set of characteristic line spectra may be received by the optical collector, and at least one characteristic spectral line may be obtained with an optical filter 306. Preferably, a wavelength of the at least one characteristic spectral line is selected from a group consisting of 3995.00 angstroms, 4630.54 angstroms, 5005.15 angstroms, and 5679.56 angstroms (see FIG. 4), which have high relative amplitude. The at least one characteristic spectral line may be detected and converted to an electrical signal by a photodetector 308. The electrical signal may be amplified from a small signal to a large signal, and the amplified electrical signal may be processed with a conventional communications receiver to obtain the data 310. In a preferred embodiment, since the fluorescence persistence time constant of nitrogen is on the order of 25 nanoseconds (1 nanosecond=$10^{-9}$ second), the process 300 may improve signal integrity (e.g., a signal to noise ratio, or the like) by allowing integration of the electronic signal over a time period longer than 25 nanoseconds. Additionally, signal integrity may be enhanced by detecting the simultaneous presence of two or more characteristic spectral lines, which random noise may be relatively unlikely to cause.

It is understood that the process 300 shown in FIG. 3 may also use LIF in a different component of the atmosphere (e.g., oxygen, argon, carbon dioxide, and the like) as a secondary optical transmission medium without departing from the scope and the spirit of the present invention.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for free space optical data link communication, comprising:
    receiving a set of characteristic line spectra, the characteristic line spectra resulting from an interaction between a transmitted modulated laser and atmospheric component molecules wherein energy of the laser causes the molecules to fluoresce;
    obtaining at least one characteristic spectral line from said set of characteristic line spectra;
    detecting said at least one characteristic spectral line and converting said at least one characteristic spectral line to an electrical signal; and
    amplifying said electrical signal and processing said amplified electrical signal to obtain data,
    wherein the step of receiving includes filtering line spectra from a secondary optical transmission medium; each of the characteristic line spectra having a different wavelength value than a wavelength value of the primary transmission medium.

2. The method of claim 1, wherein said component of the atmosphere is selected from a group consisting of oxygen, argon, and carbon dioxide.

3. The method of claim 1, wherein said component of the atmosphere is nitrogen.

4. The method of claim 3, wherein a wavelength of said at least one characteristic spectral line is selected from a group consisting of 3995.00 angstroms, 4630.54 angstroms, 5005.15 angstroms, and 5679.56 angstroms.

5. The method of claim 3, further comprising detecting two or more characteristic spectral lines of said at least one characteristic spectral line to improve signal integrity.

6. The method of claim 3, further comprising allowing integration of said electrical signal over a time period longer than a fluorescent persistence time constant of nitrogen to improve signal integrity.

7. A system for transmitting data between two objects via a free space optical data link, comprising:
    means for receiving a set of characteristic line spectra, the characteristic line spectra resulting from an interaction between a transmitted modulated laser and atmospheric component molecules wherein energy of the laser causes the molecules to fluoresce;
    means for obtaining at least one characteristic spectral line from said set of characteristic line spectra;
    means for detecting said at least one characteristic spectral line and converting said at least one characteristic spectral line to an electrical signal; and
    means for amplifying said electrical signal and processing said amplified electrical signal to obtain data,
    wherein the receiving means includes means for filtering line spectra from secondary optical transmission medium; each of the characteristic line spectra having a different wavelength value than a wavelength value of the primary transmission medium.

8. A free space optical data link communications system, comprising:
    nitrogen, the optical collector further including an optical filter configured for filtering said set of characteristic line spectra to obtain at least one characteristic spectral line from a secondary optical transmission medium, wherein the set of characteristic line spectra are emitted from the secondary optical transmission medium, each of the characteristic line spectra having a different wavelength value than a wavelength value of the primary transmission medium;
    a photo detector for detecting said at least one characteristic spectral line and converting said at least one characteristic spectral line to an electrical signal;
    an amplifier, communicatively coupled to said photo detector, for amplifying said electrical signal from a small signal to a large signal; and
    a communications receiver, communicatively coupled to said amplifier, for processing said amplified electrical signal to obtain said data.

9. The free space optical communications system of claim 8, wherein said optical filter comprises an optical interference filter with passband adapted to said at least one characteristic spectral line.

10. The free space optical communications system of claim 8, wherein a wavelength of said at least one characteristic spectral line is selected from a group consisting of 3995.00 angstroms, 4630.54 angstroms, 5005.15 angstroms, and 5679.56 angstroms.

11. The free space optical communications system of claim 8, wherein said photodetector detects two or more characteristic spectral lines of said at least one characteristic spectral line to improve signal integrity.

12. The free space optical communications system of claim 8, wherein said electrical signal is integrated over a time period longer than a fluorescent persistence time constant of nitrogen to improve signal integrity.

13. The free space optical communications system of claim 8, said modulated laser transmitter being located on a first flying aircraft, and said optical filter, said photodetector, said amplifier, and said communications receiver being located on a second flying aircraft.

* * * * *